(12) United States Patent
Grier, Sr. et al.

(10) Patent No.: US 11,424,930 B2
(45) Date of Patent: Aug. 23, 2022

(54) SYSTEMS AND METHODS FOR PROVIDING ACCOUNT INFORMATION

(75) Inventors: Ryan Wesley Grier, Sr., West Chester, PA (US); Jeffrey Douglas Cardillo, Bridgeton, NJ (US); Alexander Brown, Bryn Mawr, PA (US); Simon Ralph Dennis, Malvern, PA (US); James P. Kittridge, Winston-Salem, NC (US); Ian David Sayers, Cheshire (GB); Robert William Bethanis, Jr., Cherry Hill, NJ (US)

(73) Assignee: Barclays Bank Delaware, Wilmington, DE (US)

( * ) Notice: Subject to any disclaimer, the term of this patent is extended or adjusted under 35 U.S.C. 154(b) by 0 days.

(21) Appl. No.: 13/478,082

(22) Filed: May 22, 2012

(65) Prior Publication Data
US 2013/0318592 A1    Nov. 28, 2013

(51) Int. Cl.
*H04L 9/32* (2006.01)
*G06Q 40/02* (2012.01)

(52) U.S. Cl.
CPC .......... *H04L 9/3234* (2013.01); *G06Q 40/02* (2013.01); *H04L 2209/56* (2013.01)

(58) Field of Classification Search
CPC ..... H04L 63/00; H04L 63/08; H04L 63/0807; H04L 63/083; H04L 63/0838; H04L 63/0846; H04L 9/00; H04L 9/32; H04L 9/3202; H04L 9/321; H04L 9/3213; H04L 9/3226; H04L 9/3228; H04L 9/323; H04L 9/3234; G06F 21/00; G06F 21/30; G06F 21/31; G06F 21/34; G06F 21/35; G06F 21/43; G06F 21/44; G06F 21/45; G06Q 20/00; G06Q 20/30; G06Q 20/32; G06Q 20/3223; G06Q 20/38; G06Q 20/3821; G06Q 20/385; G06Q 20/40; G06Q 20/409; G06Q 40/02
See application file for complete search history.

(56) References Cited

U.S. PATENT DOCUMENTS

| | | | |
|---|---|---|---|
| 6,047,268 A * | 4/2000 | Bartoli et al. | 705/35 |
| 7,523,859 B2 * | 4/2009 | Patel et al. | 235/380 |
| 7,673,135 B2 * | 3/2010 | Chin | H04L 63/08 726/20 |
| 8,272,032 B2 * | 9/2012 | Choti et al. | 726/2 |

(Continued)

*Primary Examiner* — Shanto Abedin
(74) *Attorney, Agent, or Firm* — Foley & Lardner LLP

(57) ABSTRACT

Systems and methods for accessing account information are provided. For example, an indication to launch an application that may provide account information may be received. A determination may be made regarding whether the indication is an initial interaction with the application. If the indication is an initial interaction, one or more credentials may be received via an interface that may be displayed via the application. If the indication is not the initial interaction, a token may be accessed. A request that may include the credentials or token may then be generated and transmitted such that credentials or token may be used to authenticate a device that includes the application and a user thereof, a new token may be generated, and a response with the new token and/or account information may be transmitted. The account information may then be displayed by an interface of the application.

25 Claims, 8 Drawing Sheets

(56) References Cited

U.S. PATENT DOCUMENTS

| | | | |
|---|---|---|---|
| 8,533,796 B1* | 9/2013 | Shenoy | H04L 63/0846 709/225 |
| 8,554,665 B1* | 10/2013 | Zettner | G06Q 40/025 705/35 |
| 2003/0229782 A1* | 12/2003 | Bible et al. | 713/155 |
| 2007/0233540 A1* | 10/2007 | Sirota | H04L 63/105 705/7.29 |
| 2009/0037995 A1* | 2/2009 | Zapata et al. | 726/9 |
| 2009/0178112 A1* | 7/2009 | Doman | G06F 21/35 726/1 |
| 2009/0271847 A1* | 10/2009 | Karjala et al. | 726/6 |
| 2009/0300744 A1* | 12/2009 | Guo | H04L 63/105 726/7 |
| 2010/0145860 A1* | 6/2010 | Pelegero | 705/71 |
| 2010/0299220 A1* | 11/2010 | Baskerville et al. | 705/26 |
| 2011/0282678 A1* | 11/2011 | Chapman | G06F 21/6218 705/1.1 |
| 2011/0314290 A1* | 12/2011 | Fort et al. | 713/176 |
| 2012/0159603 A1* | 6/2012 | Queck | H04L 9/3215 726/9 |
| 2012/0260322 A1* | 10/2012 | Logan | G06F 21/33 726/6 |
| 2013/0159195 A1* | 6/2013 | Kirillin et al. | 705/71 |
| 2013/0282588 A1* | 10/2013 | Hruska | G06Q 20/10 705/67 |

* cited by examiner

SYSTEMS AND METHODS FOR PROVIDING ACCOUNT INFORMATION

BACKGROUND

Today, mobile applications to access credit card or bank account information may be provided for mobile devices such as mobile phones, tablets, laptops, or the like. For example, an account provider such as a bank or credit card issuer may design or develop an application that may be used by users to access their credit card or bank account information via their mobile devices. Such applications may be downloaded and installed on the mobile device such that the users may launch the applications on their mobile devices to view and access account information.

Typically, the users need to supply a username, password, personal identification number (PIN), account number, or other suitable identifier each time the application is launched by the mobile devices to access or view such account information. Unfortunately, supplying such information each time the application is launched may be tedious, and thus, may lead users to avoid using the applications.

SUMMARY

Systems and/or methods for accessing account information such as an account balance, a credit limit, available credit, a next payment date, a last payment date, or the like are disclosed. Such systems and/or methods may provide the account information without credentials being supplied by the user each time he or she wishes to access the account information. For example, a device, such as a mobile device, may receive an indication or request to launch an application on the device, which may be configured to provide or display the account information.

After receiving the indication or request, the device or application may determine whether the received indication or request is an initial interaction with the application. For example, the device or application may determine whether the indication or request received is the first time the application is launched after installation of the application on the device or after the application is reset by the user. To determine whether the indication or request may be an initial interaction with the application, the device or application may determine whether the device includes a token configured to be used to authenticate the device and the user thereof. If the device does not include a token, the application or device may flag the indication or request as an initial interaction with the application.

If the indication or request is the initial interaction with the application, the device may provide or display an interface via the application configured to receive one or more credentials associated with the user (e.g., a credential interface) and may receive the one or more credentials via the credential interface. The device may then transmit a request such as an HTTP POST request comprising the one or more credentials and an identifier associated with the device. The one or more credentials may be configured to be used to authenticate the device and the user thereof for the initial interaction with the application for access to the account information. The one or more credentials may further be configured to generate a token configured to be used to authenticate the device and the user thereof during subsequent interactions with the application for access to the account information without an additional credential being supplied by the user.

If the indication or request is not the first interaction with the application, the device and/or application may access a token stored in the device that may be associated with the user, the device, and/or the application. The device may then transmit a request such as an HTTP POST request that includes the token. The token may be configured to be used to authenticate the device and the user for access to the account information, rather than credentials that may be supplied by the user.

A system such as an account management system in communication with the device may receive the request and may determine whether the request includes a token. If the device includes a token, the system may authenticate the device and the user based on the token to provide access to the account information. If the request does not include the token (e.g., the request may include the one or more credentials), the system may authenticate the device based on the one or more credentials to provide access to the account information.

After authenticating the device and/or user via the token or the one or more credentials, the system may generate a new token configured to be used to authenticate the device and the user thereof without credentials being supplied by the user during subsequent interactions with the application that provides the account information. The token and new token may be encrypted and may be generated based on a date, a time, a customer identifier, the identifier associated with the device (e.g., a device identifier), and/or a random number. The system may then transmit a response to the received request that includes the new token and the account information such that the device may receive the response, store the new token for authentication during subsequent interactions, and provide an interface that may display the account information (e.g., an account information interface).

DETAILED DESCRIPTION

A detailed description of illustrative embodiments may now be described with reference to the various Figures. Although this description provides a detailed example of possible implementations, it should be noted that the details are intended to be exemplary and in no way limit the scope of the application.

Systems and methods for providing or accessing account information without credentials being supplied by user each time the user wishes to access such account information may be disclosed. To provide such account information without credentials being supplied by the user each time, a token or other security information may be generated by a system and may be used to authenticate the user with the system before access to the account information may be provided.

Figure 1A:
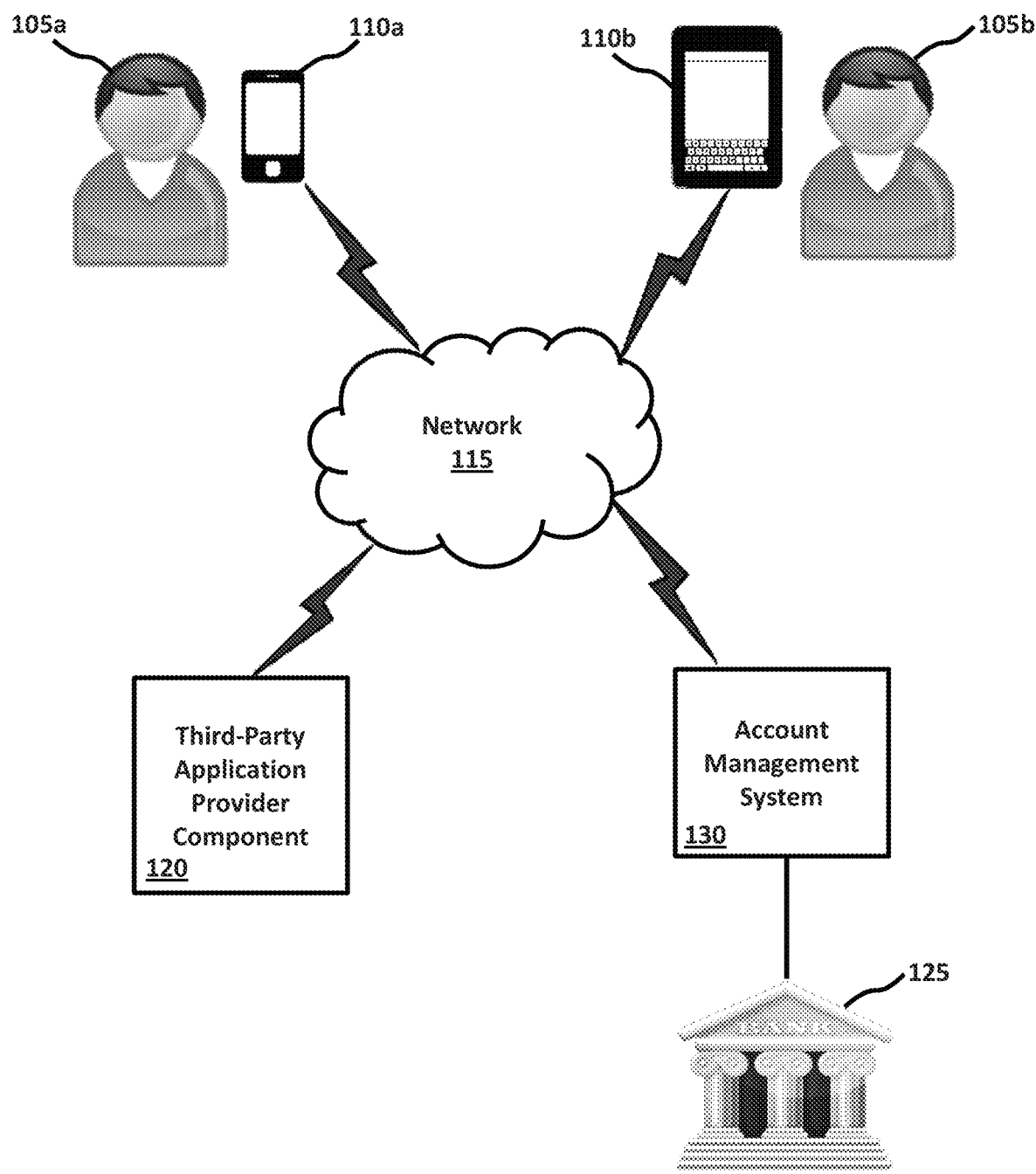
FIG. 1A illustrates a functional block diagram of an example embodiment of an account management system of an account provider in communication with one or more devices that may be operated by one or more users, and a third-party application provider component.

FIG. 1A depicts a functional block diagram of an example embodiment of an account management system in communication with one or more devices that may be operated by one or more users, and a third-party application provider component. As shown in FIG. 1A, an account management system 130 may be in communication, via a network 115, with one or more users 105a, 105b via one or more devices 110a, 110b and (e.g., optionally) with a third-party application provider component 120. The network 115 may be any suitable communication network such as a cellular network, a cable network, a satellite network, a wireless network, a local- or wide-area network including a corporate intranet or the Internet, for example.

The account management system 130 may be a system, server, database, and the like as described herein that may be operated by, maintained by, and/or associated with an account provider 125 and may be used to access and/or provide account information to the one or more users 105a, 105b via the one or more devices 110a, 110b. For example, the account management system 130 may include any combination of hardware components such as processors, databases, storage drives, registers, cache, RAM memory chips, data buses, servers, or the like and/or software components such as operating systems, information management applications, authentication applications, security or token applications, or the like such that account information associated with one or more accounts provided by the account provider 125 may be accessed, which will be described in more detail below.

The account provider 125 that may operate, maintain, and/or be associated with the account management system 130 may be financial institution such as a bank, a credit card issuer, a merchant, or any other entity or institution that may provide a financial account such as a debit card, credit card, a checking account, a savings account, gift card or store card account, a loan, an investment account, or the like.

The users 105a, 105b may be account holders such as credit card holders, debit card holders, gift or store card holders, checking account holders, savings account holders, loan holders, investment account holders, or the like of a financial account provided by the account provider 125 such that the users 105a, 105b may initiate a transaction using the financial account. Such a transaction may include purchasing goods and/or services using an instrument associated with the financial account such as a check, credit or debit card, money order, voucher, gift card, or the like, crediting funds to the financial account, or any other suitable transactions. Thus, in an example embodiment, the users 105a, 105b may be a credit card holder who may purchase goods and/or services using a credit card associated with an account provided the account provider 125.

The users 105a, 105b may communicate with the account management system 130 associated with the payment card provider 125 using the one or more device 110a, 110b. For example, the users 105a, 105b may interact with the devices 110a, 110b to communicate with the account management system 130 that may be implemented by the account provider 125, via the network 115, such that the users 105a, 105b may access account information including account balances, account spending or investing limits such as a credit limit and an available credit, payment due dates such as the last payment date (e.g., the date the last payment may have been submitted, received, and/or processed) and the next payment date (e.g., the date the next payment may be due), or any other suitable information associated with an account of the users 105a, 105b that may be provided by the account management system 130. In an example embodiment, such account information may be accessed without the users 105a, 105b logging on by supplying credentials each time, which will be described in more detail below.

The devices 110a, 110b may include hardware components such as a processor, a graphics card, a storage component, a memory component, an antenna, a communication port, or the like and software components such as an operating system that may control the hardware components. According to example embodiments, the devices 110a, 110b may be a computer, a smart phone, a tablet, a PDA, a server, or the like, which will be described in more detail below.

As shown in FIG. 1A, the users 105a, 105b, via the devices 110a, 110b, and the account management system 130 may also be in communication with a third-party application provider component 120 via the network 115. The third-party application provider component 120 may be a system (e.g., a computing system), server, database, or the like that may be operated by a third-party and may provide a repository of applications that may be hosted by the third-party on behalf of an application owner or developer. The applications may be accessed from the third-party application component 120 by the devices 110a, 110b such that the applications may be downloaded to the devices 110a, 110b, may be installed thereon, and may be executed thereby. For example, the users 105a, 105b may interact with the devices 110a, 110b to access the repository of applications hosted by the third party via the third-party application provider component 120. The users 105a, 105b may then interact with the devices 110a, 110b to download one or more applications from the repository to the devices 110a, 110b such that one or more applications may be installed on the devices 110a, 110b and executed thereby. In an example embodiment, the repository of applications hosted by the third-party provider may include an application provided or developed by the account provider 125 that may be used by the users 105a, 105b to access account information from the account management system 130 that may be associated with one or more accounts provided by the account provider 125. As described herein, such an application may enable the users 105a, 105b to access such account information without supplying credentials each time the users 105a, 105b interact with the application.

Figure 1B:
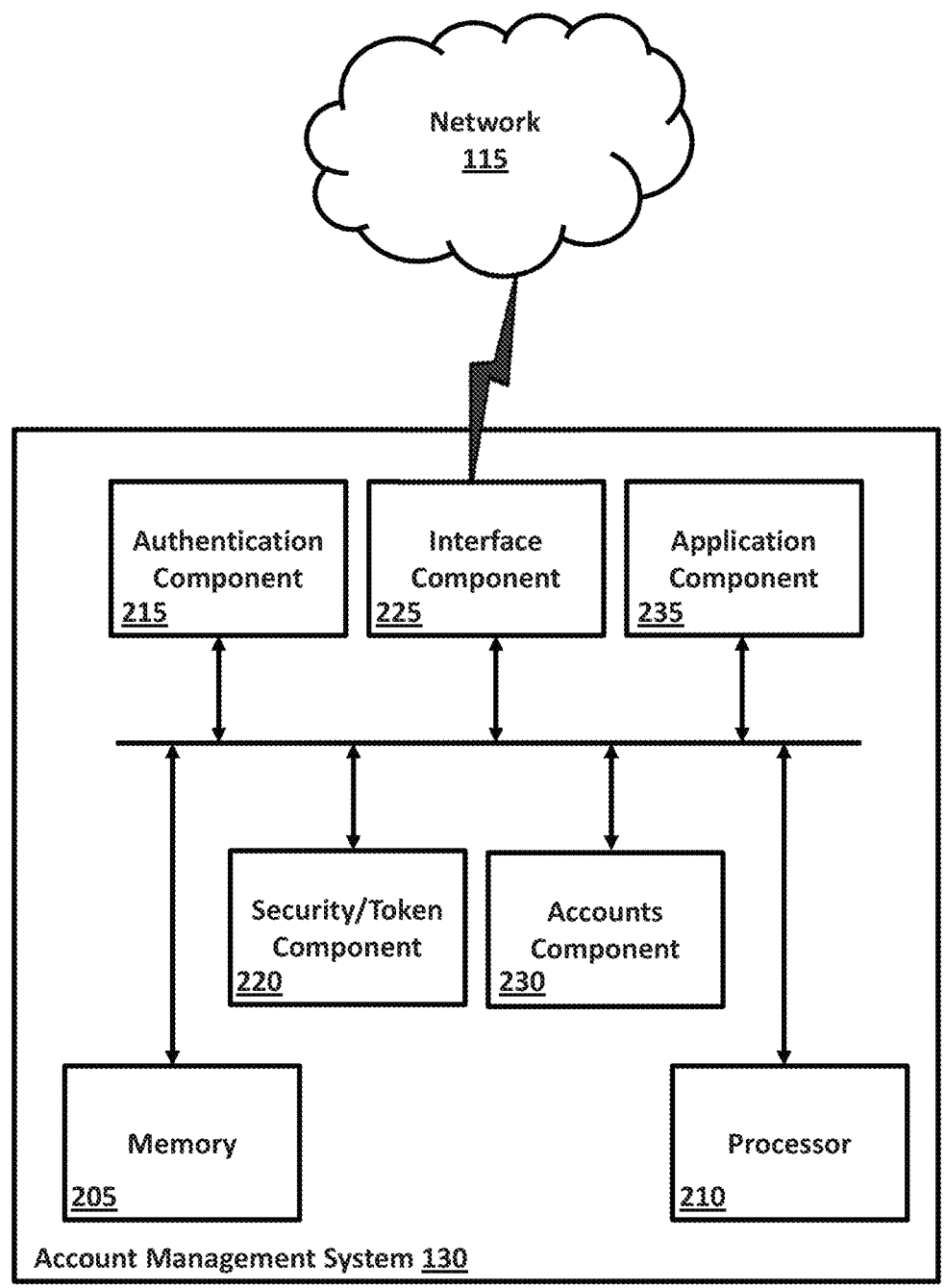
FIG. 1B illustrates an example embodiment of the account management system shown in FIG. 1A that may be maintained, operated, and/or associated with the account provider.

FIG. 1B depicts an example embodiment of the account management system 130 shown in FIG. 1A that may be maintained, operated, and/or associated with the account provider 125. The account management system 130 may include any combination of systems and sub-systems that may provide access to account information. For example, as shown in FIG. 1B, the account management system 130 may include memory 205, a processor 210, an authentication component 215, a security or token component 220, an interface component 225, an accounts component 230, and (e.g., optionally) an application component 235. The memory 205, processor 210, authentication component 215, security or token component 220, interface component 225, accounts component 230, and application component 235 may be in operative communication with each other via, for example, a bus or any other subsystem that may transfer data between components in the accounts management system 130.

The memory 205 may include circuitry that allows information to be stored and retrieved (e.g., storage devices) such as read-only memory (ROM), random-access memory (RAM), cache, storage drives, flash memory, solid-state drives, or the like. For example, the memory 205 may store instructions for accessing and/or executing the functionality of the components of the account management system 130, instructions for storing and accessing the instructions themselves, other instructions that may be executed by the processor 210 therein to access account information and implement or facilitate implementing the functionality of the components included in the account management system 130. For example, in one embodiment, instructions for receiving a request from the devices 110a, 110b, determining whether the request includes a token, authenticating the devices 110a, 110b and users 105a, 105b, generating a new token, encrypting the new token, and/or transmitting a response that may include the new token and account information may be stored in the memory 205. According to another embodiment, such instructions may be stored in the other components (e.g., the authentication component 215, security or token component 220, interface component 225, accounts component 230, application component 235, and/or processor 210) that may be included in the account management system 130.

The instructions may be executed within and by the processor 210. For example, the processor 210 may include a central processing unit (CPU), microprocessors, and/or other processors such as co-processors that may cause the account management system 130 to perform the processes or functions associated therewith. In operation, the processor 210 may fetch, decode, and/or execute instructions that may be stored in the memory 210 or other components of the account management system 130 and may transfer information to and from other resources (e.g., the other components) via the main data-transfer path or the system bus as described above. According to another embodiment, the other components (e.g., the authentication component 215, security or token component 220, interface component 225, accounts component 230, and/or application component 235) that may be included in the account management system 130 may also fetch, decode, and/or execute instructions that may be stored in the memory 210 or the other components. For example, the other components may include processor embedded therein that may fetch, decode, and/or execute instructions.

The account management system 130 may include the interface component 225. The interface component 225 may provide an overall infrastructure for the account management system 130 and may be the primary consumer of account information, authentication information, token or security information, interfaces or applications that may be displayed or downloaded, or the like. For example, the interface component 225 may provide an interface to the network 115 such that the account management system 130 and the components thereof may communicate with the devices 110a, 110b (and users 105a, 105b thereof) and the third party-application provider component 120 to transfer (e.g., transmit and/or receive) account information, applications (e.g., mobile applications) that may be used to access account information, tokens, security information, authentication information, or the like.

Such information, interfaces or applications may be transmitted and/or received by the account management system 130 using any suitable request and/or transmission methods, messages, or formats that may be supported by a Hypertext Transfer Protocol (HTTP) and/or a Secure Hypertext Transfer Protocol (HTTP/S), Web Services/Simple Object Access Protocol (SOAP) and/or any other suitable Web-based access mechanisms. For example, in an embodiment, the interface component 225 may receive information from the devices 110a, 110b such as a token, one or more credentials, or the like via an HTTP POST request (e.g., in a message body thereof) such that the account management system 130 may use the received information to determine one or more accounts and the corresponding account information associated with the users 105a, 105b requesting such account information via the devices 110a, 110b and may then, in response, thereto transmit the account information to the devices 110, 110b via a javascript protocols or formats such as javascript object notation (JSON) over HTTP, HTTP protocols or formats, or any other suitable format or protocol.

To provide such an interface, the interface component 225 may include any combination of hardware components such as a network adaptor that may include a wired (e.g., via a physical cable or connector) or wireless (e.g., via an antenna) transceiver, receiver, and/or transmitter that may be used to connect the account management system 130 to an external communication network such as the network 115, processors, databases, storage drives, registers, cache, RAM memory chips, data buses, or the like and/or software components software components such as operating systems, management applications such as Web-based management applications, or the like.

The interface component 225 may maintain its own processes, such as user management, rules required to make intelligent use of the account information, requests, responses, tokens or security information, or the like, which may be provided to and by the users 105a, 105b via the devices 110a, 110b, for example. For example, the interface component 225 may include stored therein account information, tokens or security information, applications or interfaces (e.g., Web pages), instructions (e.g., computer readable and computer-executable instructions), and may execute such instructions to implement its processes.

The interface component 225 may also serve to interact and interface with the other functional components of the account management system 130, including the memory 205, the processor 210, the authentication component 215, the security or token component 220, the accounts component, and/or the application component 235 to provide access to account information, applications such as mobile applications for accessing account information, interfaces and/or instructions for receiving a request from the devices 110a, 110b, determining whether the request includes a token, authenticating the devices 110a, 110b and users 105a, 105b, generating a new token, encrypting the new token, and/or transmitting a response that may include the new token and account information, execute such instructions (e.g., to implement the processes or functionality of the interface component 225), and/or to generate or validate tokens or security information.

For example, as described above, the interface component 225 may be in communication with the authentication component 215 that may be included in the account management system 130. The authentication component 215 may include any combination of hardware components such as processors, databases, storage drives, registers, cache, RAM memory chips, data buses, or the like and/or software components such that the authentication component 215 may provide a mechanism for authenticating the users 105a, 105b when a request to access account information may be made by the users 105a, 105b via the devices 110a, 110b.

For example, when the users 105a, 105b may initially interact (e.g., a first interaction or an initial access) with an application that may be installed on the devices 110a, 110b and used to access account information associated with one or more account the users 105a, 105 b may have with the account provider 125, the users 105a, 105b, devices 110a, 110b, and/or application may be authenticated via a credential such as an account number, username, Personal Identification Number (PIN), password, or the like before such account information may be accessed and/or tokens or security information that may be used to access the account information during subsequent interactions may generated for the users 105a, 105b. When the user may subsequently interact with the application (e.g., after the initial or first interaction), the users 105a, 105b, devices 110a, 110b, and/or application may be authenticated via a token that may be previously generated for the users 105a, 105b, devices 110a, 110b, and/or application before such account information may be accessed and/or subsequent or new tokens or security information that may be used to access the account information during subsequent interactions may generated for the users 105a, 105b.

The authentication component 215 may also verify whether the users 105a, 105b and the devices 110a, 110b may be eligible to run or execute the application, download the application, install the application, and/or receive account information via the installed application. For example, the authentication component 210 may be used to determine whether the devices 110a, 110b may have suitable specifications (e.g., a suitable operating system, sufficient hardware (e.g., a suitable amount of memory), or the like) to install and execute the application.

The account management system 130 may also include a security or token component 220. The security or token component 220 may include any combination of hardware components such as processors, databases, storage drives, registers, cache, RAM memory chips, data buses, or the like and/or software components such that the security or token component 220 may receive an indication that the application on the devices 110a, 110b, the devices 110a, 110b, and the users 105a, 105b thereof may be authenticated (i.e. that the users 105a, 105b may have accounts with the account provider 125), for example, from the authentication component 215, may receive account information associated with the accounts of the users 105a, 105b (e.g., from the accounts component 230), and may generate security information or one or more tokens for the application, devices 110a, 110b, and/or users 105a, 105b. The security information or the one or more tokens may be used to access the account management system 130 and account information of accounts that the users 105a, 105b may have with the account provider 125 after an initial access (e.g., the first access after the application may be installed or the first access after the application may be reset) of the account management system 130 by the users 105a, 105b via an interaction with the application on the devices 110a, 110b.

For example, as described herein, the users 105a, 105b may initially interact (e.g., a first interaction or initial access after installation and/or a reset) with an application such as a mobile application on the devices 110a, 110b to access and view account information associated with one or more accounts that the users 105a, 105b may have with the account provider 125 by supplying credentials such as a username, password, PIN, account number, or the like via the application. The authentication component 215 may authenticate the users 105a, 105b, the mobile devices 110a, 110b, and/or the application after the first interaction based on the credentials supplied by the users 105a, 105b and received by the account management system 130 via, for example, the interface component 225. After authenticating the users 105a, 105b, the mobile devices 110a, 110b, and/or the application as described above, the authentication component 215 may provide an indication to the security or token component 220 that the users 105a, 105b, the mobile devices 110a, 110b, and/or the application may be authenticated (e.g., the users 105a, 105b may have an account and the credentials supplied may be valid or associated with the account). The security or token component 220 may then generate security information or a token that may be passed back or provided to the mobile devices 110a, 110b and/or the application such that the security information or token may be sent back to the account management system 130 to authenticate the users 105a, 105b, the mobile devices 110a, 110b, and/or the application in subsequent interactions with the application by the users 105a, 105b to access account information without the users 105a, 105 supplying credentials. As such, security information or a token may be provided to and received by the account management system 130 and, for example, the authentication component 215 thereof each time the application may be launched after the initial or first interaction with the application including the first interaction after installation of the application or the first interaction after the application may be reset on the devices 110a, 110b such that the security information or token may be used to authenticate the users 105, 105b, devices 110a, 110b, and/or the application to provide access (e.g., subsequent access) to account information associated with one or more accounts of the users 105a, 105b, which will be described in more detail below.

According to an embodiment, the generated token (e.g., associated with the security information) may include at least one of the following: a date, a time, a customer identifier (ID), a device identifier (ID), and/or a random number. Additionally, in an example embodiment, the generated token (e.g., or other security information) may be encrypted by the security or token component 220 using, for example, an AES 1024 key, base 64 or any other suitable encryption key, base, and/or technique.

The account management system 130 may also include an accounts component 230. The accounts component 230 may be configured to store account information corresponding to or associated with one or more accounts that may be provided by the account provider 125 and that may be accessed by the users 105a, 105b via the application that may be installed on and executed by the devices 110a, 110b. The accounts component 230 may include, for example, a database, ROM or RAM memory chips, registers, cache, hard drives, or any other suitable hardware components designed to store data such as account information (e.g., account balances, credit limits, available credit, payment due date, last payment date, transactions, account statements, or the like) associated with accounts that may be provided by the account provider 125 and/or any suitable software components. The accounts and account information that may be stored in the accounts component 230 may be indexed by the credential such as the account number, username, Personal Identification Number (PIN), password, or the like that may be provided by the user 105 during an initial interaction with the application on the devices 110a, 110b or by information associated with the tokens or security information that may be used during subsequent interactions to access the account information provided by the account management system 130.

The account management system 130 may also include an application component 235. The application component 235 may include hardware components such as processors, RAM memory chips, registers, cache, hard drives, or any other suitable hardware component and/or software components that may be used to provide an application that may be downloaded by the users 105a, 105b on the devices 110a, 110b to access account information associated with one or more accounts the users 105a, 105b may have with the account provider 125.

For example, the application component 235 may provide a repository of applications that may be provided by the account provider 125. One application included in the repository may be the application described herein that may be downloaded by the users 105a, 105a and installed on the mobile devices 110a, 110b to access account information associated with one or more accounts that the users 105a, 105b may have with the account provider 125. According to an embodiment, the users 105a, 105b may interact with the devices 110a, 110b to access the repository of applications hosted by the account management system 130 and provided (e.g., designed or developed) by the account provider 125. The users 105a, 105b may then interact with the devices 110a, 110b to download the application that may be used to access account information from the repository to the devices 110a, 110b such that the applications may be installed on the devices 110a, 110b and executed thereby. As described above, the application provided or developed by the account provider 125 that may be used by the users 105a, 105b to access account information from the account management system 130 may also be hosted by a third-party application provider component 120 (e.g., instead of or in conjunction with the applications component 235 that may be included in the account management system 130).

Figure 1C:
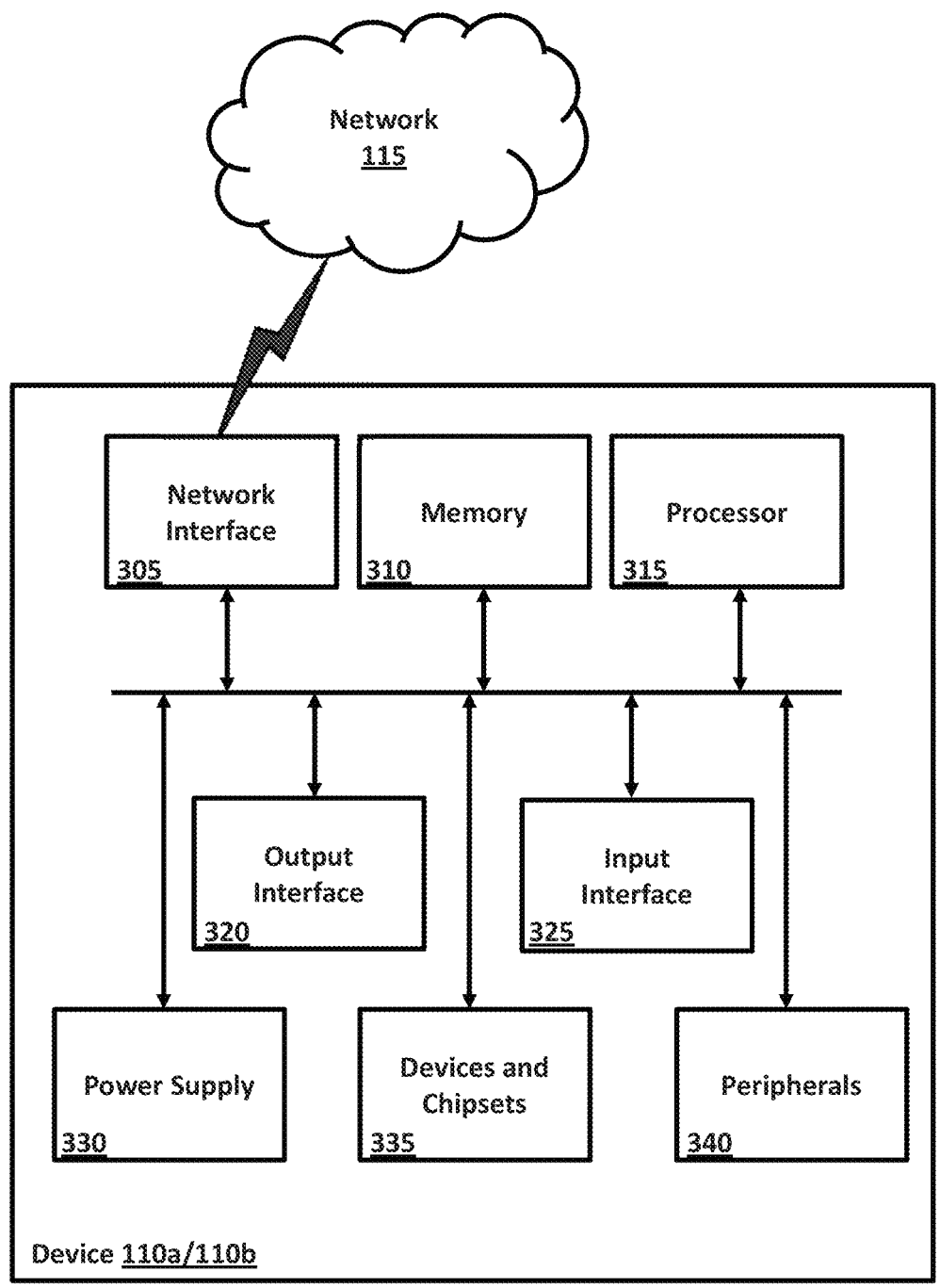
FIG. 1C illustrates an example embodiment of the one or more devices shown in FIG. 1A that may be used by one or more users.

FIG. 1C illustrates an example embodiment of the devices 110a, 110b shown in FIG. 1A that may be used by the users 105a, 105b to access account information. The devices 110a, 110b may include a variety of computing devices (e.g., cell phone, smartphone, handheld computer, personal digital assistant (PDA), etc.) and may allow wireless two-way communications with one or more communications networks such as a cellular or satellite network including network 115. For example, as shown in FIG. 1C, the devices 110a, 110b may include a network interface 305 that may enable the devices 110a, 110b to communicate with a network such as the network 115 and components that may be connected to the network including the third-party application provider component 120 and/or account management system 130 shown in FIG. 1A. The network interface 305 may be a network adaptor that may include a wireless transceiver, receiver, and/or transmitter (e.g., via an antenna) that may be used to connect the devices 110a, 110b to the communication network such as the network 115. The network interface 305 may be configured to transmit signals and data to a network 115 and components connected to the network 115 and/or receive signals and data from the network 115 and components connected to the network 115.

According to an embodiment, the devices 110a, 110b may be capable of executing a variety of computing applications such as an application that may be used to access account information without using credentials each time the application may be used to access such account information as described herein. The application may include an application programming interface (API), a computing application, a computing applet, a computing program and other instruction set operative on the devices 110a, 110b to perform at least one function, operation, and/or procedure (e.g., access account information). Similar to the account management system 130, the devices 110a, 110b may be controlled by computer readable or executable instructions including instructions for storing and accessing the computer readable or executable instructions themselves and/or instructions for receiving an indication or request to launch the application, determining whether the indication or request may be an initial interaction with the application, providing a credential interface, receiving credentials, accessing a token, transmitting a request that includes the credentials or token, receive a response with a new token and/or account information, providing an account information interface that may display the account information, or the like.

The devices 110a, 110b may also include a memory 310 and a processor 315. The memory 305 may include removable and/or non-removable circuitry that allows information to be stored and retrieved (e.g., storage devices) such as read-only memory (ROM), random-access memory (RAM), cache, storage drives, a subscriber identity module (SIM) card, a memory stick, a secure digital (SD) memory card, or the like. In an embodiment, the applications including the application for accessing the account information, the computer readable or executable instructions thereof, computer readable or executable instructions of other functionalities that maybe performed by the device 110a, 110b, a subscriber identifier such as an International Mobile Subscriber Identity (IMSI) and/or an equipment identifier such as an International Mobile Equipment Identifier (IMEI) associated with the users 105a, 105b and/or the devices 110a, 110b or information that may be used to identify the devices 110a, 110b, data, documents, media, or the like may be stored in the memory 310. For example, the memory 310 may store instructions for receiving an indication or request to launch the application, determining whether the indication or request may be an initial interaction with the application, providing a credential interface, receiving credentials, accessing a token, transmitting a request that includes the credentials or token, receive a response with a new token and/or account information, providing an account information interface that may display the account information, or the like that may be executed by the device 110a, 110b to access account information.

Such applications and instructions that may be stored in the memory 310 may be executed within and by the processor 315. For example, the processor 315 may include a central processing unit (CPU), microprocessors, and/or other processors such as co-processors that may cause the device 110a, 110b to perform the processes or functions associated therewith. In operation, the processor 315 may fetch, decode, and/or execute instructions that may be stored in the memory 310 and may transfer information to and from other resources (e.g., the other components) via a main data-transfer path or the system bus. For example, the processor 315 may execute the instructions for receiving an indication or request to launch the application, determining whether the indication or request may be an initial interaction with the application, providing a credential interface, receiving credentials, accessing a token, transmitting a request that includes the credentials or token, receive a response with a new token and/or account information, providing an account information interface that may display the account information, or the like.

The network interface 305, the memory 310, and/or the processor 315 of the devices 110a, 110b may be coupled to an output interface 320 such as a liquid crystal display (LCD) unit, a light-emitting diode (LED), an organic LED, a speaker, or the like that may display or output visual and audio information to the users 105*a*, 105*b* including account information and/or an input interface 325 such as a keypad, display or touchpad associated with an output interface (e.g., a touchscreen), a microphone, buttons, or the like that may receive input from the users 105*a*, 105*b* including gestures, data input, or the like for selecting and launching applications such as an application for accessing account information installed on the devices 110*a*, 110*b* and inputting credentials, or the like.

The network interface 305, the memory 310, and/or the processor 315 (along with the output interface 320 and input interface 325) of the devices 110*a*, 110*b* may also be coupled a power supply 330 that may include batteries, fuel cells, solar cells, or other suitable power source that may be configured to distribute and/or control the power to the components in the devices 110*a*, 110*b*; devices and/or chipsets; devices and/or chipsets 335 such as a GPS chipset, that may be configured to provide location information associated with the devices 110*a*, 110*b*; and/or peripherals 340 that may include any suitable hardware and/or software for additional features, functionality and/or wired or wireless connectivity of the devices 110*a*, 110*b* such as an accelerometer, an e-compass, a satellite transceiver, a camera, a universal serial bus (USB) port, a vibration device, a Bluetooth® module, or the like.

Figure 2A:
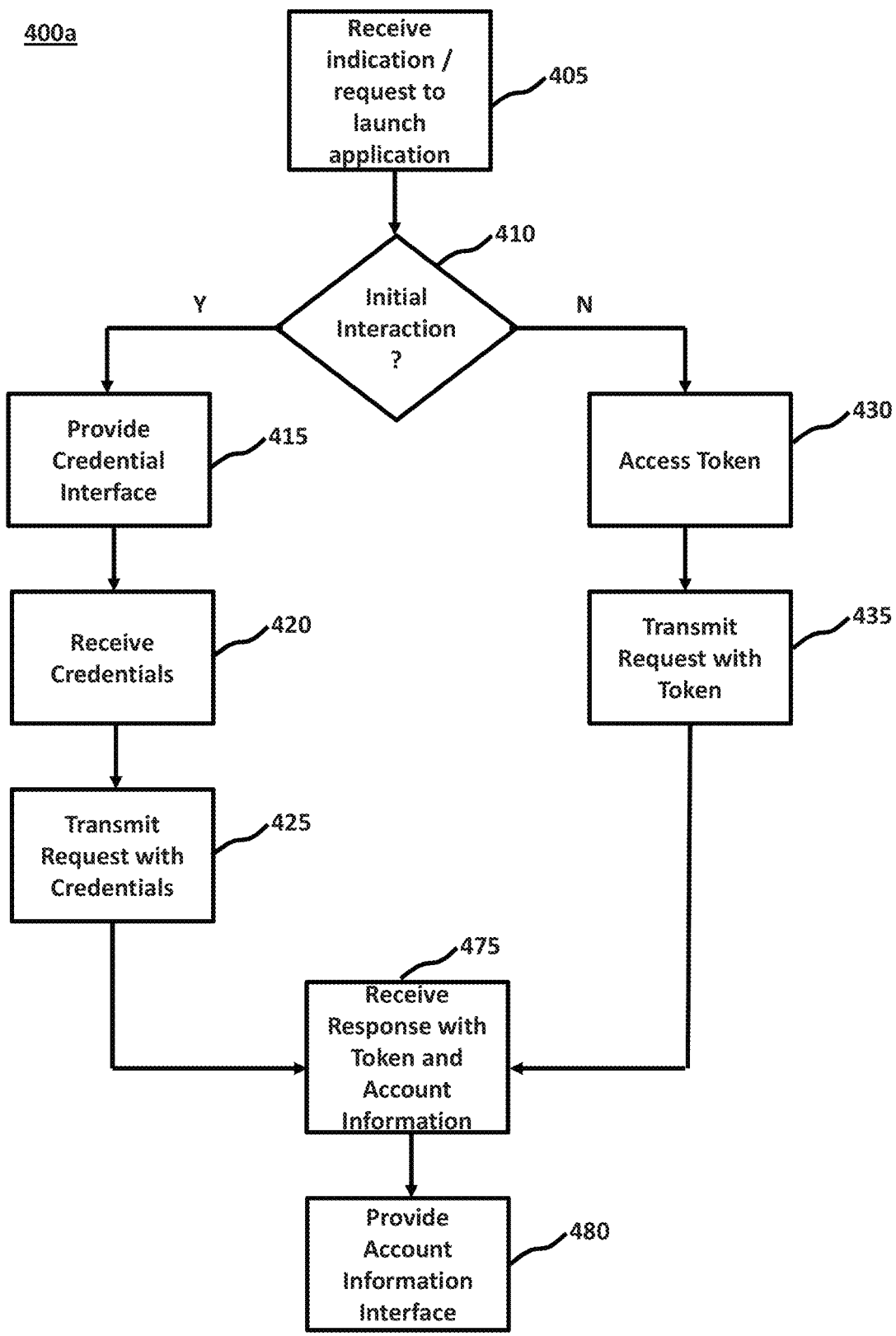
FIGS. 2A-2B depict example embodiments of flowcharts for example methods that may provide account information as described herein.

FIG. 2A depicts an example embodiment of a flowchart for an example method 400*a* that may provide account information as described herein. The example method 400*a* may be implemented and performed by the components, systems, and/or components described above in FIGS. 1A-1C such as the devices 110*a*, 110*b*. For example, the method 400*a* may be in the form of computer readable and executable instructions that may be executed by the devices 110*a*, 110*b* (e.g., via one or more processors stored therein as described above).

As shown in FIG. 2A, at 405, an indication or request to launch an application for accessing account information may be received. For example, as described above, a user such as the users 105*a*, 105*b* shown in FIG. 1A may interact with an application (e.g., a mobile device application) downloaded and installed on a device such the devices 110*a*, 110*b* shown in FIGS. 1A and 1C to access account information. To interact with the application, the user may select an icon or shortcut associated with the application on a device interface such as a home page interface, a toolbar interface, or the like associated with the device. After such an icon or shortcut may be selected, an indication of the selection of the icon or shortcut (e.g., an indication or request to launch the application) may be received at 405. The application may then be launched or executed on the device such that the user may interact with the application and one or more interfaces such as graphical user interfaces associated therewith to access account information associated with one or more accounts that the user may have with an account provider such as the account provider 125 shown in FIG. 1A above.

Figure 3A:
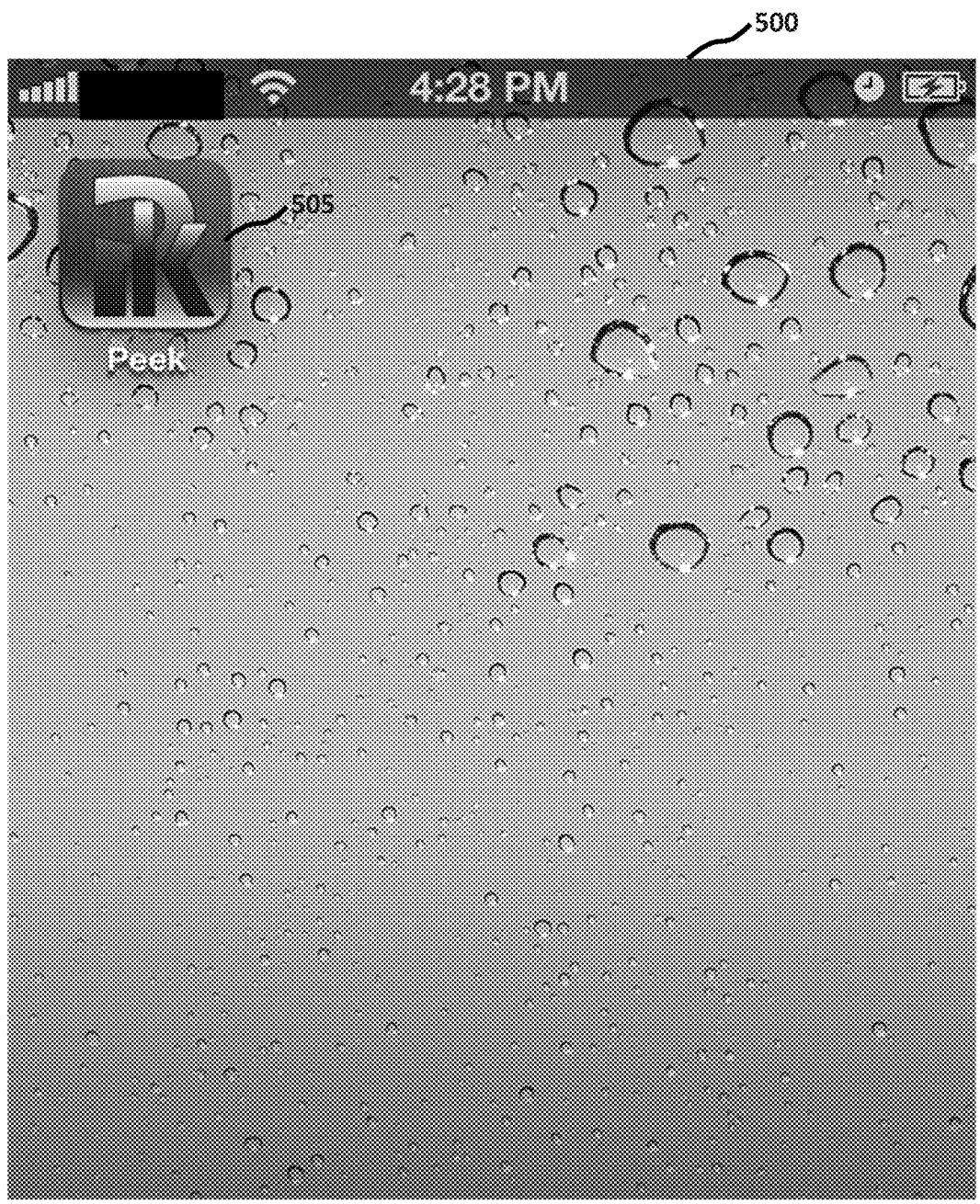
FIGS. 3A-3C illustrate example embodiments of example interfaces that may be displayed by the one or more devices shown in FIGS. 1A and 1C to provide account information according to the example method in FIGS. 2A-2B.

FIG. 3A illustrates an example embodiment of a device interface 500 that may be used to launch the application that a user may interact with to access account information. As shown in FIG. 3A, the device interface 500 may include an icon or shortcut 505 associated with the application such that the user may select the icon or shortcut 505 to launch or execute the application on the device. At 405 shown in FIG. 2A, an indication of the selection of the icon or shortcut 505 may be received. The application may then be launched or executed on the device as described above.

Referring back to FIG. 2A, at 410, a determination regarding whether an interaction with the application (e.g., the received indication or request associated with the selection of the icon or shortcut) may be an initial interaction or the first interaction with the application on the device after installation or being reset may be made. For example, after the application may be launched and executed on the device, the device may determine, at 410, whether the indication or request to launch the application may be the first time the application may be launched (e.g., an initial or first interaction with the application) after the application may have been installed on the device or the application may have been reset. To determine whether the indication or request may be an initial interaction with the application, the device or application may determine whether the device may include a token configured to be used to authenticate the device and the user thereof. If the may not include a token, the application or device may flag the indication or request as a first or initial interaction with the application.

If, at 410, the interaction with the application may be the first or initial interaction, a credential interface associated with the application may be provided or output to the users on the device at 415. For example, if an interaction with the application by the user and/or device may be the first time the application may be launched on the device after installation or being reset, a credential interface that may be configured to receive credentials associated with the users to access one or more accounts and account information associated therewith may be provided or output on the device via the application at 415. As described above, the one or more accounts may be provided by an account provider and the account information associated therewith may be stored in and accessed by (e.g., provided) an account management system such as the account management system 130 shown in FIGS. 1A and 1B associated with the account provider. The users may interact with the credential interface to supply a username, password, PIN, account number, or the like that may be used to initially authenticate the user such that the user may access one or more accounts the users may have with the account provider and the account information associated therewith such that the credential may be received, at 420, by the application and/or device.

Figure 3B:
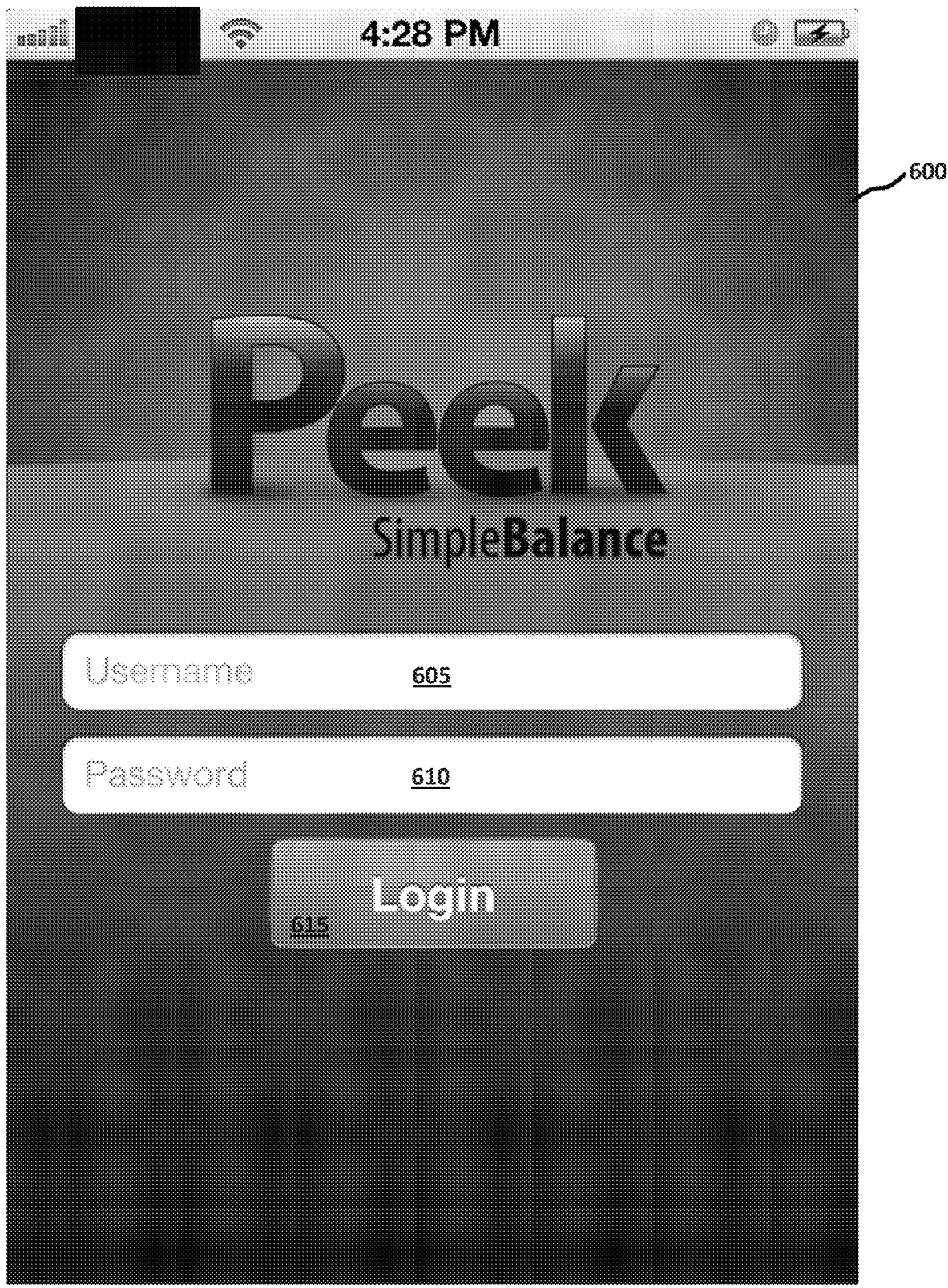

FIG. 3B illustrates an example embodiment of a credential interface 600 that may be provided or output at 415 in FIG. 2A. As described above, the credential interface 600 may be configured to receive one or more credentials that may be used to authenticate and/or access an account and account information associated therewith. The credential interface 600 may include a username input block 605, a password input block 610, and a log-in button 615 as shown in FIG. 3B. According to an example embodiment, the user may input his or her username (or account number) in the account input block 605 and/or password or PIN in the password input block 610. After the user has finished inputting or entering his or her credentials in the account input block 605 and/or password input block 610, the user may click or tap the log-in button 615 such that the credentials may be received by the application and/or device at 420.

Referring back to FIG. 2A, after receiving the credentials at 420, a request may be transmitted with the credentials at 425. For example, after receiving one or more credentials, the application and/or device may generate a request that may include such credentials that may be used to access the one or more accounts and account information (e.g., included in the account management system) and/or an identifier associated with the device and/or users. In an embodiment, the request may be an HTTP POST request that may include, for example, in a message body thereof)

the credentials such as the username, password, PIN, and/or account number that may be supplied via the credential interface provided at 415 and received at 420. The request may further include a device identifier associated with the device that may be provided from the operating system of the device or may be embedded or assigned to the device including an equipment identifier such as an International Mobile Equipment Identifier (IMEI), a subscriber identifier such as an International Mobile Subscriber Identity (IMSI), or any other suitable information that may be used to identify the devices, users, and/or application. After generating the request, the request including the information included therein such as the credentials and/or identifier may be transmitted at 425. According to an example embodiment, the request may be received by an account management system such that the user, device, and/or application may be authenticated, security information or a token may be generated to authenticate the user, device, and/or application, and/or account information may be accessed associated with the user, device, and/or application, which will be described in more detail below.

If, at 410, the interaction with the application may be not be the first or initial interaction, a token previously provided to the device (e.g., a previous token) and/or application may be accessed at 430. For example, if an interaction with the application by the user and/or device may be the second time, third time, and so on (e.g., a subsequent interaction after the initial or first interaction), security information or a token associated with the user to access an account or account information associated therewith that may be provided by the account provider via the account management system and may be stored on the device may be accessed at 430. According to an example embodiment, the security information and/or a token stored on the device may be accessed without user interaction (e.g., without the user supplying credentials).

After accessing the security information or token at 430, a request may be transmitted with the token (e.g., the previous token) at 435. For example, after the initial interaction with the application, a token may be received by and stored on the device such that the token may be used to access one or more accounts or account information (e.g., authenticate the user, device, and/or application). As described above, such a token may be accessed at 430. After accessing the security information or token, a request may be generated at 435. In an embodiment, the request may be an HTTP POST request that may include, for example, in a message body thereof the token. After generating the request, the request including the token may be transmitted at 435. According to an example embodiment, the request may be received by the account management system such that the user, device, and/or application may be authenticated, security information or a token (e.g., a new token) may be generated to authenticate the user, device, and/or application, and/or one or more accounts and account information associated therewith may be accessed by the user, device, and/or application, which will be described in more detail below.

According to an example embodiment, after transmitting the request with the credential and/or token (e.g., a previous token), a response to the request may be received at 475. The response may include account information associated with the credentials and/or token supplied in the request and authenticated and a token (e.g., an initial token if the request may have included credentials and/or a new token if the request may have included a token such a previous token). The response received, at 475, may be in a javascript protocol or format such as javascript object notation (JSON) over HTTP, a HTTP protocol or format, or any other suitable format or protocol.

In response to receiving the response at 475, an account information interface may be provided or output at 480. For example, after receiving a response with the account information and/or a token, an account information interface may be provided or output on the device via the application at 480. The account information interface may include account information such as an account balance, a credit limit, available credit, a payment due date, a previous payment date, or the like associated with one or more accounts authenticated by the credentials and/or token transmitted in the request at 425 or 435. According to an example embodiment, the account information may be in a native or raw data format that may not require credentials to be supplied each time the account information may be accessed as described herein.

Figure 3C:
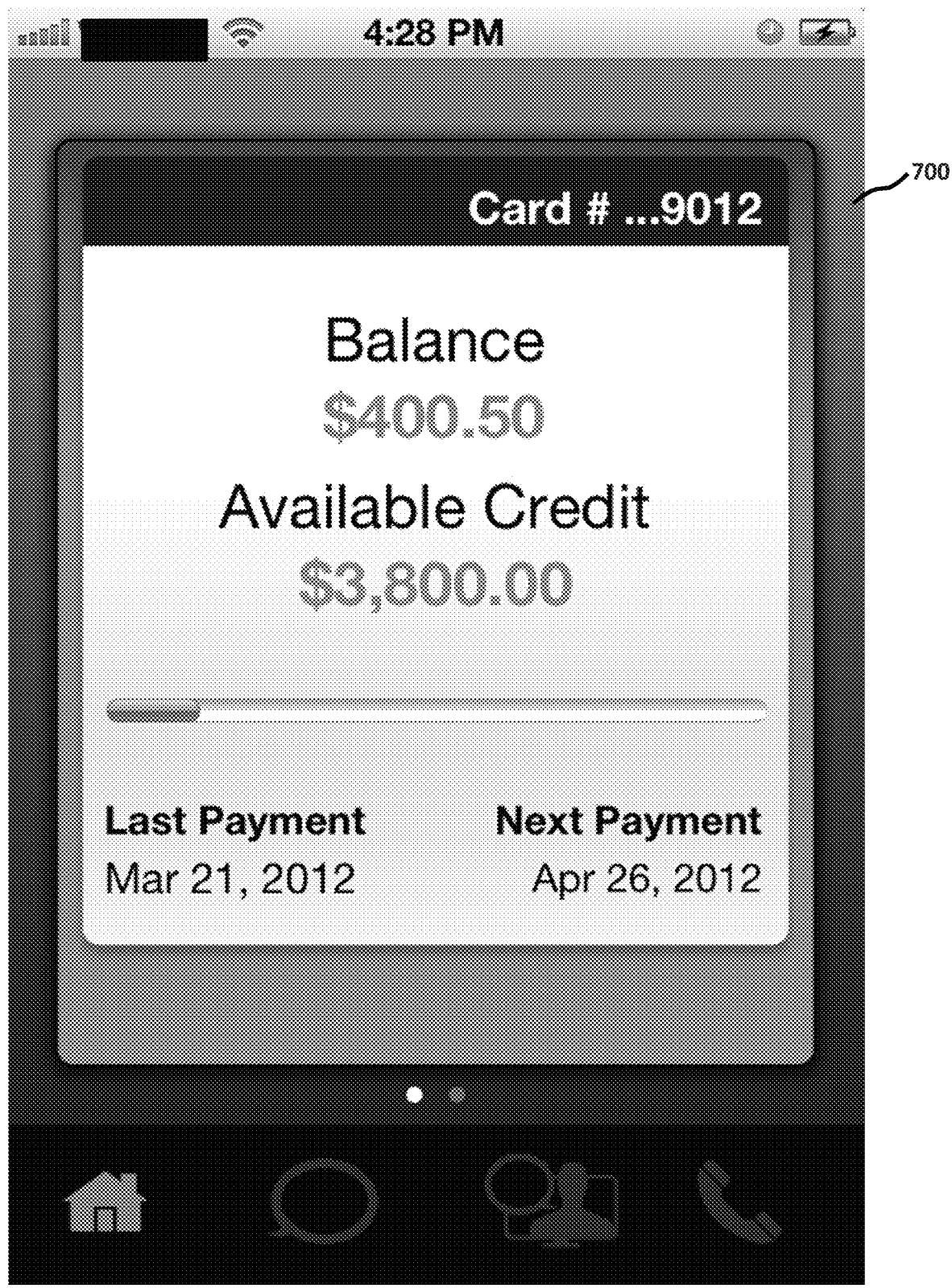

FIG. 3C illustrates an example embodiment of an account information interface 700 that may be provided or output at 480. As shown in FIG. 3C, the account information interface 700 may provide a balance associated with one or more accounts of the user, an available credit of the one or more accounts, the date of the last payment or the last payment date, the date of the next payment, a portion of the account number associated with the one or more accounts, or the like. As described above, such account information provided on the account information interface 700 may be displayed without the user logging in or supplying credentials with each interaction of the application on the device. In an example embodiment, each account may be displayed on separate account interfaces like the account interface 700 such that the user may swipe his or her finger on the screen of the device or depress a button on the device to switch between the separate account interfaces.

Figure 2B:
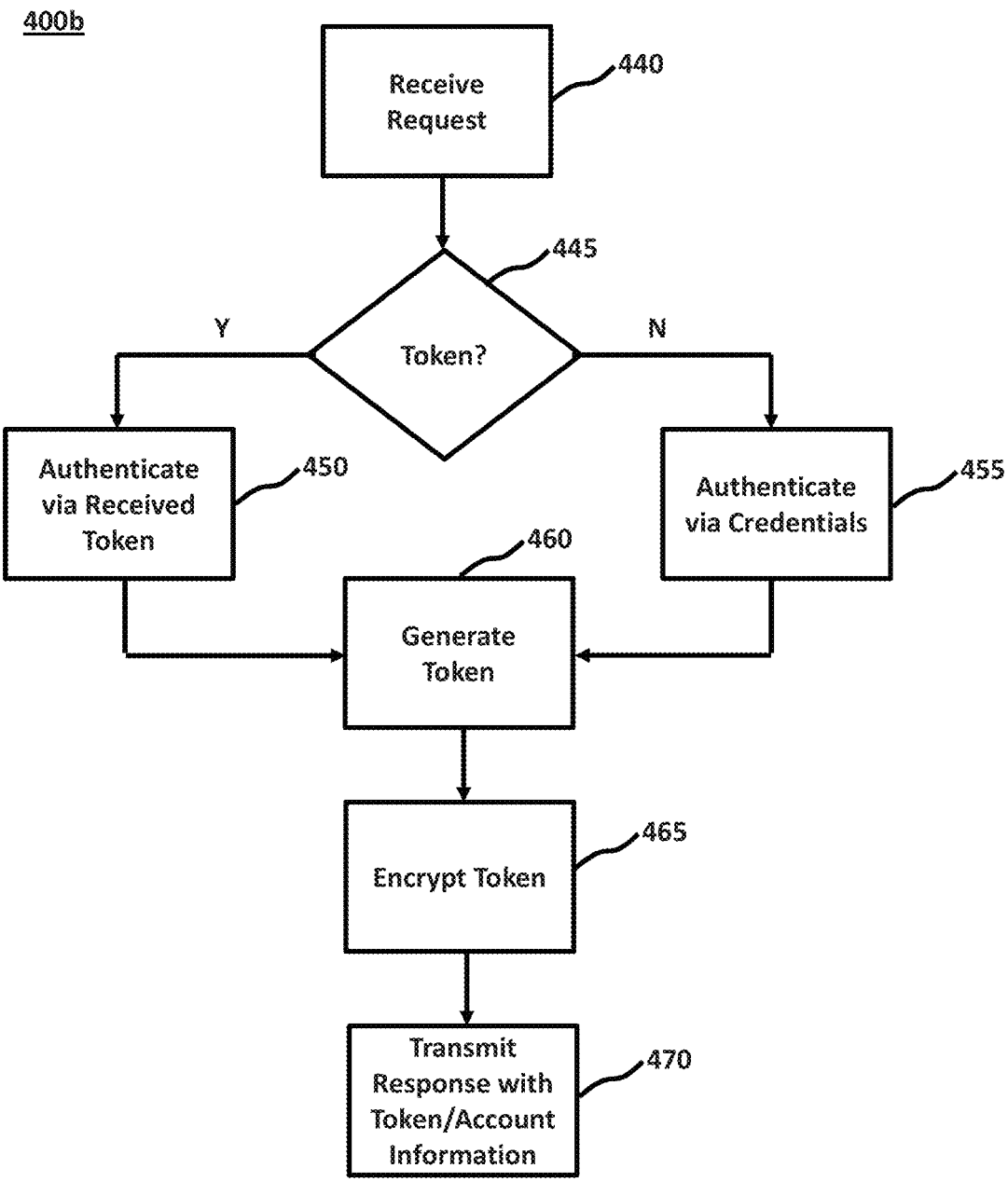

FIG. 2B depicts an example embodiment of a flowchart for an example method 400*b* that may provide account information as described herein. The example method 400*b* may be implemented and performed by the components, systems, and/or components described above in FIGS. 1A-1C such as the account management system 130. For example, the method 400*b* may be in the form of computer readable and executable instructions that may be executed by the account management system 130 (e.g., via one or more processors stored therein as described above).

As shown in FIG. 2B, a request may be received at 440. For example, in an embodiment, an account management system such as the account management system 130 shown in FIGS. 1A and 1C may receive the request transmitted, for example, at 425 or 435. The request may be indicative of an interaction with the application on the device to access account information. As described above, the request may be an HTTP POST that may include one or more credentials, an identifier, and/or a token.

At 445, a determination regarding whether the request received at 440 may include a token and/or credentials may be made. For example, after the request may be received at 440, the account management system (e.g., via one or more components therein) may determine, at 445, whether the request may include a token or a credential.

If, at 445, the request may include a token or other security information (e.g., the request may be the request transmitted at 435 in FIG. 2A), the user, device, and/or application may be authenticated using the token at 450. For example, if the request received, at 440, may include a token, the account management system may authenticate or verify that the user, device, and/or application may have an account with the account provider associated with the account management system, that the user, device, and/or application may be authorized to access the account, that the token may be valid, or the like based on token. In an embodiment, to authenticate and/or verify the users, device, and/or application based on a token received in the request, the account management system may compare, at 450, the received token with valid tokens associated with accounts included in the account management system to determine whether the token included in the request may match a previous token generated for one or more accounts and/or the user associated therewith that may be stored in the account management system. If the token may match a previous token generated for one or more accounts included in the account management system, the account management system may generate a new token and may provide access to account information associated with the one or more accounts that may have a previous token that may match the received token.

If, at 445, the request may include one or more credentials (e.g., the request may be the request transmitted at 425 in FIG. 2A), the user, device, and/or application may be authenticated using the one or more credentials at 455. For example, if the request received, at 440, may include the one or more credentials and/or an device identifier, the account management system may authenticate or verify that the user, device, and/or application may have one or more accounts with the account provider associated with the account management system, that the user, device, and/or application may be authorized to access the account, or the like based on the one or more credentials. In an embodiment, to authenticate and/or verify the token received in the request, the account management system may compare, at 455, the received credential or credentials with credentials and/or device identifiers associated with accounts included in the account management system to determine whether the one or more credentials included in the request may be associated with previously created credentials that may be registered by the user for one or more accounts stored in the account management system. If the one or more credentials received may match credentials previously registered or set up with the account management system, the account management system may generate a new token for the account and may provide access to account information associated with the one or more accounts that may have a credential or credentials that may match the received credential or credentials.

After authenticating, at 450 and/or 455, the user, device, and/or application using the one or more credentials and/or the token received, a new token may be generated at 460. For example, the account management system may receive an indication that the user, device, and/or application may be authenticated at 450 and/or 455 and may generate security information or one or more tokens for the user, device, and/or application at 460 in response thereto. As described herein, the security information or the one or more tokens may be used to access the account management system, one or more accounts in the account management system, and account information associated therewith that the user may have with the account provider and that may be included in the account management system. At 460, the new token may be generated based on the credentials and/or device identifier included in the request transmitted at 425 in FIG. 2A and received at 440 and/or a previously generated token that may be included in the request transmitted at 435 in FIG. 2A and received at 440. As such, a new token may be generated, at 460, based on the credentials (e.g., if the request may be associated with an initial or first access or interaction) and/or the previous tokens (e.g., for subsequent interactions or access) in response to each request received at 440 and may be transmitted back to the device at 480 such that a new token may be used for each authentication.

The generated token or security information may include or be based on at least one of the following: a date, a time, a customer identifier (ID) (e.g., that may be associated with the credentials), a device identifier (ID), and/or a random number. The generated token or security information may also be generated, at 460, using a hashing algorithm, function, routine or subroutine such as a secure hash algorithm 1 (SHA-1) hashing function such that the information that may be included in the token generated, at 460, may include data that may have a fixed length.

After generating the token at 460, the token may be encrypted at 465. For example, at 465, the account management system may encrypt the token generated at 460. In an example embodiment, the generated token (e.g., or other security information) may be encrypted by the using, for example, an AES 1024 key, base 64 algorithm or function such as AES/CBC/PKCSSPadding 1024 or any other suitable encryption key, base, function, algorithm, and/or technique.

A response with a token and/or account information may then be transmitted at 470. For example, after the token may be encrypted at 465, the account management system may generate a response (e.g., to the request received at 440). In an embodiment, the response may be in a javascript protocol or format such as javascript object notation (JSON) over HTTP, a HTTP protocol or format, or any other suitable format or protocol that may include the generated and/or encrypted token and/or account information that may be accessed based on the authentication including an account balance of one or more accounts, a credit limit of the one or more accounts, available credit of the one or more accounts, a past payment date of the one or more accounts, a next payment date of the one or more accounts, or the like. The account information included in the response may be raw data. For example, the account information may be in an unencrypted native format that may not be associated with or may not include or may not provide an indication of sensitive or confidential information associated with the one or more accounts such as an account number, a security code, a routing number, or the like. After generating the response, the response including the token and/or account information may be transmitted at 470. According to an example embodiment, the request may be received by a device such as the device 110*a*, 110*b* shown in FIGS. 1A and 1C such that the account information may be displayed on the device and the token may be used during a subsequent interaction with the application to authenticate the user and access account information without user interaction (e.g., without the user supplying credentials). For example, at 475 in FIG. 2A, the device may receive the response generated at 470 in FIG. 2B with the token generated at 460 in FIG. 2B and/or account information associated with one or more accounts of the user such that the device may display the account information at 480 in FIG. 2A and the device may access the token at 430 in FIG. 2A during subsequent interactions with the application on the device.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Additionally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). Additionally, one or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

What is claimed:

1. A method comprising:
    determining, at a user device, that a first indication is an initial request to provide account information at the user device by determining whether the device includes a token, and if the device does not include a token, determining that the first indication is the initial request;
    upon determining that the first indication is an initial request:
        flagging, by the user device, that the first indication is an initial request;
        sending, from a user device, a first request to a device for account information via an application on the user device, the first request including user credentials, wherein the user credentials are only sent when an indication is an initial request, wherein the user authentication credentials enable authentication of the user device and to generate a token associated with the identifier of the user device, wherein the token is encrypted and enables authentication of the user device without the user entering any authentication credentials;
    receiving the token and account information at the application on the user device;
    determining, based on presence of the token at the user device, that a second indication is not an initial request to provide account information;
    upon determining that the second indication is not an initial request, sending, from the user device, a second request to a device for account information via an application on the user device, the second request including the token and not including user credentials;
    receiving limited access, at the user device, to select account information in response to the device receiving the token without user credentials.

2. The method of claim 1, wherein the user device provides a request comprising a Hypertext Transfer Protocol (HTTP) POST request.

3. The method of claim 1, further comprising:
    providing, on the user device, a credential interface configured to receive user authentication credentials based on a determination that the received indication is the initial request to provide the account information via the application;
    receiving, at the user device, the user authentication credentials via the credential interface; and
    transmitting, via the user device, a request comprising the user authentication credentials and an identifier associated with the user device.

4. The method of claim 3, wherein the request comprises a Hypertext Transfer Protocol (HTTP) POST request.

5. The method of claim 3, wherein the user authentication credentials and the identifier associated with the user device enable authentication of the user device and the user thereof for the initial request to provide the account information via the application and to generate the token for a subsequent request to provide the account information.

6. The method of claim 1, further comprising:
    receiving, at the user device, a second response comprising another token and the account information; and
    providing, on the user device, an account information interface displaying the account information.

7. The method of claim 1, wherein the select account information comprises at least one of the following: an account balance; a credit limit; available credit; a last payment date; and a next payment date.

8. The method of claim 1, wherein the token is generated based on at least one of the following: a date, a time, a customer identifier, a device identifier, and a random number.

9. A method comprising:
    receiving an indication to provide account information at a user device via an application;
    determining, at the user device, whether the received indication is an initial request to provide the account information via the application by determining whether the device includes a token, and if the device does not include a token, determining that the received indication is an initial request;
    flagging, by the user device, that the received indication is an initial request and providing a credential interface on the user device that receives user authentication credentials based on the determination that the received indication is the initial request to provide the account information via the application;
    receiving, at the user device, the user authentication credentials via the credential interface;
    transmitting, via the user device, a request comprising the user authentication credentials and an identifier of the device, wherein the user authentication credentials are only sent when the indication is an initial request, wherein the user authentication credentials enable authentication of the user device and to generate a token associated with the identifier of the user device, wherein the token is encrypted and enables authentication of the user device without the user entering any authentication credentials, wherein the token is transmitted to the user device along with an authentication response;

receiving a second indication to provide account information at a user device via an application;

determining, based on presence of the token at the user device, that a second indication is not an initial request to provide account information;

upon determining that the second indication is not an initial request, sending, from a user device, a second request to a device for account information via an application on the user device, the second request including the token and not including user credentials;

obtaining at the user device limited access to select account information in response to the user device providing the token for authentication without user credentials.

10. The method of claim 9, wherein the user device provides a request comprising a Hypertext Transfer Protocol (HTTP) POST request.

11. The method of claim 9, further comprising:

receiving a subsequent request to provide the account information at the user device via the application; and determining, at the user device, whether the subsequent request is the initial request to provide the account information via the application.

12. The method of claim 11, further comprising:

accessing, via the user device, the token based on the determination that the subsequent request is not the initial request to provide the account information via the application; and transmitting, via the user device, a request comprising the token, wherein the token is enables authentication of the user device for access to the account information without the user entering any authentication credentials.

13. The method of claim 9, further comprising:

receiving, at the user device, a second response comprising the token, wherein the response comprises another token and the account information; and providing, on the user device, an account information interface displaying the account information.

14. The method of claim 13, wherein the token and the other token are based on a secure hash algorithm I (SHA-I) hashing function.

15. The method of claim 9, wherein the select account information comprises at least one of the following: an account balance; a credit limit; available credit; a last payment date; and a next payment date.

16. The method of claim 9, wherein the token is generated based on at least one of the following: a date, a time, a customer identifier, a device identifier, and a random number.

17. A system comprising:

a hardware processor having programmed instructions to:

receive, via an application, a request to provide the account information from a user device;

determine whether the request comprises a token, wherein the token indicates that the request is not an initial request;

upon determining that the request is the initial request:

flag that the request is the initial request upon determining the request does not include the token;

send a first token and user credentials to the device responsive to the flagging that the request is an initial request, wherein the user credentials are only sent when the request is an initial request and wherein the first token is encrypted and enables authentication of the device without user authentication credentials for a subsequent request and indicate at the user device that the subsequent request to provide the account information is not an initial request for the account information;

receive the subsequent request via the application to provide the account information from the user device, wherein the subsequent request includes the first token;

authenticate the user device and the user thereof based on presence of the first token at the user device to provide access to select account information; and provide the user device via the application with only limited access to select account information when the first token, without user credentials, is used for authentication.

18. The system of claim 17, wherein the hardware processor has programmed instructions to encrypt the first token and a second token.

19. The system of claim 18, wherein the first token is encrypted using an AES 1024 key and a base 64.

20. The system of claim 17, wherein the first token is generated based on at least one of the following: a date, a time, a customer identifier, a device identifier, and a random number.

21. The system of claim 20, wherein the request comprises a credential and the device identifier, and wherein the hardware processor has programmed instructions to:

authenticate the user device based on the credential when the request does not comprise the token; and generate the first token associated with the device identifier when the user device and the user thereof are authenticated with the credential received in the request.

22. The system of claim 17, wherein the select account information comprises at least one of the following: an account balance; a credit limit; available credit; a last payment date; and a next payment date.

23. The method of claim 1 wherein an initial request is the first interaction with the application or initial access to the application after installation and/or reset of the application.

24. The method of claim 9 wherein an initial request is the first interaction with the application or initial access to the application after installation and/or reset of the application.

25. The system of claim 17 wherein an initial request is the first interaction with the application or initial access to the application after installation and/or reset of the application.

* * * * *